United States Patent Office 3,449,233
Patented June 10, 1969

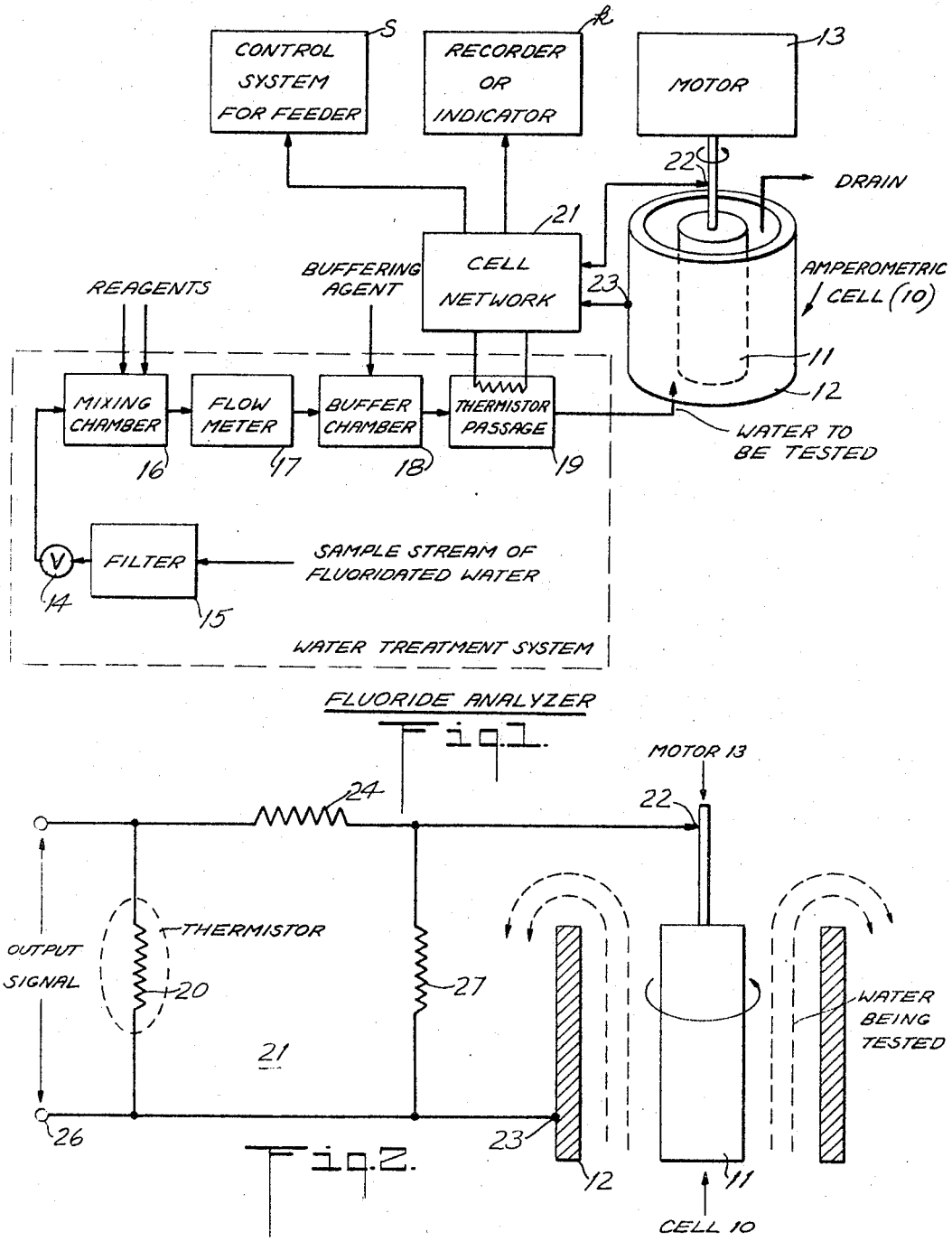

3,449,233
FLUORIDE ANALYZER
James J. Morrow, Norristown, Pa., assignor to Fischer & Porter Co., Warminster, Pa., a corporation of Pennsylvania
Filed Nov. 10, 1966, Ser. No. 593,340
Int. Cl. B01k 3/00
U.S. Cl. 204—195   12 Claims This invention relates generaly to techniques for detecting the presence and concentration of fluorides in water, and more particularly to a fluoride analyzer based on the amperometric principle and adapted to accurately and continuously measure fluorides to provide a permanent record of the fluoride level in a water supply as well as to carry out fluoride control functions.

Because fluorides are believed to reduce the incidence of dental caries, many communities now add this chemical to their water supply. In order to maintain a concentration of fluorides sufficient to produce the desired effect but not in excess of acceptable levels, it is important that the concentration of the fluorides be continuously monitored.

Heretofore, the continuous determination of fluoride concentration in water has for the most part been carried out by standard colorometric methods. In general, equipment utilizing the colorometric technique has serious practical drawbacks, for apart from being expensive, the equipment is not applicable to turbid or colored waters. Moreover, such equipment often has a high inherent time constant and is subject to various interferences. It must be borne in mind that fluoridated drinking water is also usually chlorinated and may contain other constitutents acting as interferents in testing for fluoride content.

Another approach to determining fluoride concentration entails the use of a fixed aluminum electrode in an electrical cell of the type disclosed in Patent 2,870,067, wherein current is caused to flow as a result of spontaneous electrolysis. But recent studies have shown that such cells are neither reliable nor accurate. An instrument based on differential conductivity has also been devised, but this instrument requires a continuous double distillation to separate the fluoride from interfering substances, and in addition has a high time constant.

In view of the foregoing, it is the main object of this invention to provide a fluoride analyzer whose operation is based on the amperometric principle, and which acts to afford a continuous, accurate and permanent record of the fluoride level in a water supply.

More specifically, it is an object of the invention to provide a highly sensitive fluoride analyzer which includes an amperometric cell formed by a rotating electrode of high-purity aluminum surrounded by a counter-electrode, preferably formed of an aluminum alloy to define a flow passage through which the fluid to be analyzed is fed.

A significant feature of the invention resides in the fact that the analyzer is not only useful as a monitor or "watch dog" against feeder malfunction or failure, but it is also applicable to the control of fluoride feeding equipment in the water supply. The accuracy of the analyzer is unimpaired by turbidity or color in the water supply, interfering species such as chlorine being eliminated by adding appropriate reagents.

Also an object of the invention is to provide an amperometric cell for fluoride analysis which spontaneously generates a current only when fluoride is present in the sample stream, the cell including an electrode requiring no special pre-treatment and a coutnerelectrode or cathode from which a significant current can be drawn, the response of the cell being virtually instantaneous.

Still another object of the invention is to provide a fluoride analyzer of the above-described type, whose electrical output is substantially independent of water temperature and pH factor, whereby the reading precisely reflects the fluoride concentration.

Briefly stated, these objects are accomplished in a fluoride analyzer including an amperometric cell formed by an aluminum anode of exceptionally high purity concentrically disposed within a tubular cathode, preferably formed of an aluminum alloy having a copper content, the anode being rotated at a constant, relatively high speed, a sample stream of water first passing through a treatment system wherein the sample is subjected to dechlorinating and complexing reagents, the water also being buffered to reduce its pH to a desired level, the treated stream then passing through the annular passage between the anode and cathode of the cell, whereby in the absence of fluoride the anode is polarized, but in the presence thereof, depolarization takes place to cause a current to flow in said cell which is detected and indicated or recorded to provide a reliable and continuous reading of fluoride concentration.

For a better understanding of the invention, as well as other objects and further features thereof, reference is made to the following description to be read in conjunction with the accompanying drawing, wherein:

FIG. 1 shows in block from a fluoride analyzer in accordance with the invention; and FIG. 2 schematically illustrates the amperometric cell included in the analyzer and its associated electrical circuit.

THE STRUCTURE AND OPERATION OF THE ANALYZER

Referring now to FIG. 1, the fluoride analyzer in accordance with the invention makes use of an amperometric cell, generally designated by numeral 10, and constituted by an anode electrode 11, concentrically disposed within a counter-electrode or cathode 12, the anode being rotated at high speed by a motor 13, the position of the cathode being fixed.

A sample stream from a fluoridated water supply to be continuously analyzed is fed into the cell 10 through a treatment system including a control valve 14 in the input thereof. The valve is placed in the line after a suitable mechanical filter 15 to remove particulate matter from the stream, the output of the filter going to a mixing chamber 16 into which de-chlorinating and complexing reagents are fed to minimize the effect of interfering species, reagents are drawn from suitable reservoirs in the instrument and are smoothly and continuously added by means of a positive-displacement type pump.

The liquid from mixing chamber 16 is fed through a flowmeter 17 into a buffering chamber 18, where it is treated by a buffering agent, such as acetic acid sodium acetate, to reduce the pH of the water to about 4.1 to 4.4. The buffered water then flows through a passage 19 having a thermistor 20 disposed therein, this passage leading to the bottom of the cell. In the cell, the treated sample stream passes upwardly through the annular space between the anode and cathode, the liquid at the top flowing out of the cell to drain.

The cathode and anode of the cell are connected to an electrical network generally designated by numeral 21, which includes thermistor 20, the circuit yielding a signal whose magnitude depends on the fluoride concentration of water passing through the cell. The signal produced by network 21 is applied to an indicator or a potentiometric recorder R or any other form of recording instrument to provide a continuous record of the fluoride concentration. The signal may also be applied to an automatic control system S for comparison with a reference value to regulate the fluoride feeder mechanism in the water supply to maintain a desired fluoride level.

As shown separately in FIG. 2, anode 11 is composed of aluminum of high purity, while cathode 12 is preferably fabricated of an aluminum alloy. It has been found that the purity of the aluminum anode is critical, for even with an anode of 99.80% purity, the output at a constant fluoride concentration was found to be unstable, and the cell response was sluggish when the fluoride level was changed.

With a 99.85% (minimum) purity, the response time was improved, but the repeatability was again poor. Good cell performance was attained only when an anode having 99.99% (minimum) purity was used in conjunction with an aluminum alloy cathode (Alcoa 2011T3—5.5% Cu, 0.5% Pb, 0.5% Bi, the remainder aluminum—by weight). It is believed that the exceptionally high purity of the anode is essential, for anything less appears to give rise to local cell action resulting in poor performance. The cathode for the cell is formed of a material which produces a potential of such sign and magnitude in the liquid that its combination with the aluminum anode potential results in a spontaneously acting cell. While a response is obtainable with gold, lead, and copper cathodes, the reproducibility of such cells is relatively poor.

A fluoride ion by itself has very low electrochemical activity, but with a pure aluminum anode, fluoride forms strong soluble complex ions, the aluminum metal dissolving in a fluoride salt.

The output of the cell is taken from between a spring-loaded brush 22 engaging a ring on the shaft of motor 13 rotating the anode, and a fixed contact 23 connected to the cathode. Motor 13 operates at high speed, such as at 1650 r.p.m., whereby the polarization and depolarization anode actions are uniformly distributed on the anode surface. Brush 22 is connected through a precision resistor 24 to one output terminal 25, the other output terminal 26 going directly to cathode contact 23. A second precision resistor 27 is connected between brush 22 and contact 23, whereas the thermistor 20 is shunted across the output terminals. In operation, current flowing through resistor 27 as a result of cell activity develops a voltage thereacross, the values of this voltage at the output terminals being corrected by thermistor 20.

When the dechlorinating and complexing reagents are added to the sample stream, the composition of the anode is such that polarization thereof occurs in the absence of fluoride in the sample. Polarization renders the cell non-conductive and substantially no current flows therethrough. The existence of the smallest trace of fluoride in the sample stream acts to depolarize the anode, giving rise to the following reaction:

$$Al + 6F^- \rightarrow AlF_6^{3-} + 3e$$

At the stationary counter-electrode or cathode, the following reaction takes place:

$$3H^+ + 3e \rightarrow 3/2 H_2$$

The anode is also subject to depolarization by hydroxide ions. Hence it is essential that the sample water be reduced in pH. When buffer is added at a constant rate to a flowing stream, the extent of pH reduction is also a function of sample flow rate. It has been found, however, that at a fixed sample flow rate, the cell output is relatively independent of pH when the value thereof is between 4.15 and 4.45. Within this same pH range, the output is essentially independent of flow above 200 cubic centimeters per minute (cc./min.). It is desirable, therefore, that the flow rate be maintained at 220 cc./min., and the pH between 4.1 and 4.4. This rate is adjustable by means of valve 14. In practice, proper pH reduction may be achieved by employing four high-capacity acetate buffers with provisions for varying their respective feed rates.

Amperometric cells inherently possess a temperature coefficient that depends on electrode reaction kinetics. Since seasonal water temperature variations are inevitably present in water installations calling for fluoride measurement, it is essential that the output of the cell be compensated for such variations. The function of temperature. Since the thermistor is shunted across the output of the cell circuit 21, it serves to cancel out the effect of temperature on the output of the cell network.

TEST DATA

To evaluate the precision and accuracy of the amperometric cell, a method was used that inherently was accurate and did not depend on any other method of analysis. A 55-gallon drum was carefully calibrated so that a measurement of water level with a meter stick could be directly related to the volume in liters. In addition, a standard fluoride solution was prepared so that when 10.0 ml. of the solution was added to 180 liters of water, the resulting solution would be 1.00 mg. F-/l. The water in the drum then could be adjusted to the desired fluoride concentration and pumped through the fluoride analyzer at a rate of 220 cc./min. When the output reached a steady value, the volume was re-measured and another appropriate amount of the standard fluoride solution added.

The precision and accuracy of the cell was evaluated by making thirteen separate calibrations over a thirty-day period. Results are shown in Table I below. Between calibrations, the analyzer operated continuously on fluoridated water at about 1 mg. F-/l. For each calibration, the fluoride concentration was varied over at least six levels ranging from 0.2 to 2.0 mg. F-/l.

TABLE I

| Mg. F-/l. added | Av. mg. F-/l. found | Number of determinations | Relative precision, percent |
|---|---|---|---|
| 0.20 | 0.22 | 3 | 4.1 |
| 0.30 | 0.30 | 3 | 5.3 |
| 0.40 | 0.41 | 4 | 2.7 |
| 0.50 | 0.51 | 3 | 5.3 |
| 0.60 | 0.60 | 5 | 5.0 |
| 0.70 | 0.71 | 3 | 3.2 |
| 0.80 | 0.80 | 7 | 3.0 |
| 0.90 | 0.90 | 7 | 1.6 |
| 1.00 | 1.01 | 9 | 1.8 |
| 1.10 | 1.10 | 7 | 1.6 |
| 1.20 | 1.20 | 6 | 1.9 |
| 1.30 | 1.31 | 4 | 1.2 |
| 1.40 | 1.40 | 3 | 0.9 |
| 1.50 | 1.50 | 5 | 0.9 |
| 1.60 | 1.59 | 3 | 0.8 |
| 1.70 | 1.71 | 4 | 0.7 |
| 1.80 | 1.79 | 3 | 0.6 |
| 1.90 | 1.89 | 3 | 1.1 |
| 2.00 | 1.97 | 3 | 1.2 |

Table I shows the output of the amperometric cell is linear over a zero to 2.0 mg. F-/l. range. Actually, with a normal size electrode (i.e., a rod one inch in length and 0.4″ in diameter), linearity is maintained up to 4 mg. F-/l. If the electrode diameter is reduced to 0.3″, the linear range may be extended to 6 mg. F-/l.

Studies were conducted to determine the effect on the signal at 1 mg. F-/l. for species which may be present in a sample stream. Throughout the studies, sample water was maintained at 70° F., a flow rate of 200 cc./min., and buffered to pH 4.2.

Ions which showed no interference and the limit at which they were studied are shown in Table II below:

Table II

| Ion: | Max. mg./l. studied |
|---|---|
| $Br^-$ | 10 |
| $SO_4^{2-}$ | 200 |
| $SO_3^{2-}$ | 10 |
| $NO_2^-$ | 10 |
| $CO_3^{2-}$ | 500 |
| $NO_3^-$ | 100 |

| Ion: | Max. mg./l. studied |
|---|---|
| $Ca^{+2}$ | 250 |
| $Mg^{+2}$ | 300 |
| $SiO_2$ | 8 |
| $Cr^{+6}$ | 5 |

Copper +2 is plated out at the aluminum anode at concentrations as low as 0.04 mg./l. and is a serious interferent. However, the effect of copper for concentrations as high as 3 mg./l. can be completely eliminated by making the sample water $10^{-4}$ M in EDTA (ethylene diamene tetra acetic acid).

Chlorine and dissolved oxygen in the water also interfere by cathodically depolarizing the anode. By making the sample water $10^{-3}$ M in $Na_2SO_3$, interference is eliminated for air-saturated water containing up to 18 mg./l. chlorine. Chloride ion and hexametaphosphate ion cause a 0.1 mg. $F^-$/l. error when present at 220 milligrams per liter and 6.2 mg./l., respectively.

$Fe^{+3}$, $PO_4^{3-}$, and $Al^{+3}$ ions are all interferents, even when the sample water is made $10^{-4}$ M in EDTA. The effect of $Al^{+3}$, the most serious offender, can be reduced somewhat, e.g., from an 0.16 mg. $F^-$/l. error to a −0.10 mg. $F^-$/l. error, at a concentration of 0.3 mg. $Al^{+3}$/l., by increasing the concentration of EDTA in the sample stream to $10^{-3}$ M. Ferric iron causes a −0.07 p.p.m. error for 1 p.p.m. $F^-$ present at 3 p.p.m. and phosphate a 0.1 p.p.m. error in fluoride if present at 0.7 p.p.m.

For all the interference mentioned above, which cannot be eliminated by the addition of EDTA or $Na_2SO_3$, it is significant that their presence does not materially affect the sensitivity of the cell to fluoride. The errors serve onyl to cause an apparent shift in the zero current. In essence, then, they can be "zeroed out" at time of calibration.

While there have been shown a preferred technique and a preferred embodiment of fluoride analyzer in accordance with the invention, it will be appreciated that many changes and modifications may be made therein without, however, departing from the essential spirit of the invention as defined in the annexed claims.

What I claim is:
1. A fluoride analyzer for measuring the fluoride level in a fluoridated water supply, said analyzer comprising:
    (a) an amperometric cell constituted by an anode disposed concentrically within a tubular cathode to define an annular space therebetween, said anode being formed of aluminum of high purity, said cathode being formed of a material resulting in a spontaneously acting cell,
    (b) means to rotate said anode at a constant relatively high rate,
    (c) circuit means coupled between said anode and cathode to derive a signal therefrom as a function of current flow in said cell, and
    (d) water treatment means to remove interferents from a sample stream of water to be analyzed and to conduct it into said annular space in said cell at a predetermined flow rate whereby said aluminum anode is polarized in the absence of fluoride to produce substantially no current flow in said cell and is depolarized in the presence of fluoride to produce a current flow therein which depends on the concentration of fluoride.

2. An analyzer, as set forth in claim 1, wherein said cathode is an aluminum alloy having about 5% by weight of copper.

3. An analyzer, as set forth in claim 1, wherein said aluminum purity is better than 99%.

4. An analyzer, as set forth in claim 1, wherein the aluminum has a minimum purity of 99.99%.

5. An analyzer, as set forth in claim 1, wherein said circuit means includes a thermistor disposed in said water-treatment means and responsive to the temperature of water to compensate for the effect thereof on the output of said circuit means.

6. An analyzer, as set forth in claim 1, wherein said water-treatment means includes a buffering agent to reduce the pH of the water to about 4.1 to 4.4.

7. An analyzer, as set forth in claim 1, wherein said water-treatment means includes de-chlorinating and complexing reagents.

8. An analyzer, as set forth in claim 1, wherein said means to rotate said anode is constituted by a motor operating above 1100 r.p.m.

9. An analyzer, as set forth in claim 1, wherein the output of said circuit means is applied to a recorder to provide a continuous and permanent record of fluoride level.

10. An analyzer, as set forth in claim 1, wherein the output of said circuit means is applied to a control mechanism for a fluoride feeder to maintain the fluoride level automatically at a desired level.

11. An analyzer, as set forth in claim 1, wherein the sample water stream is fed to the bottom of said cell to pass upwardly into the annular space and to drain from the top thereof.

12. An analyzer, as set forth in claim 1, wherein said cathode composition is by weight, 5.5% copper, 0.5% lead, 0.5% bismuth, the remainder being aluminum.

References Cited
UNITED STATES PATENTS

| | | | |
|---|---|---|---|
| 2,870,067 | 1/1959 | Baker et al. | 204—1.1 |
| 3,028,317 | 4/1962 | Wilson et al. | 204—195 |
| 3,058,901 | 10/1962 | Farrah | 204—195 |
| 3,314,874 | 4/1967 | Flournoy | 204—272 |
| 3,385,774 | 5/1968 | Thompson et al. | 204—212 |

JOHN H. MACK, Primary Examiner.

T. TUNG, Assistant Examiner.

U.S. Cl. X.R.

204—1, 212, 272

PO-1050
(5/69)

UNITED STATES PATENT OFFICE
CERTIFICATE OF CORRECTION

Patent No. 3,449,233                    Dated   June 10, 1969

Inventor(s)   James J. Morrow

It is certified that error appears in the above-identified patent and that said Letters Patent are hereby corrected as shown below:

Column 1, line 69, change "coutnerelectrode" to
 -- counterelectrode --

Column 4, lines 6, 7, change "The function of temperature" to -- The resistance value of thermistor 20 changes as a function of temperature . --

**SIGNED AND
SEALED
SEP 3 0 1969**

(SEAL)
Attest:

Edward M. Fletcher, Jr.

WILLIAM E. SCHUYLER, JR.
Commissioner of Patents

Attesting Officer